(12) United States Patent
Liu et al.

(10) Patent No.: US 9,753,276 B2
(45) Date of Patent: Sep. 5, 2017

(54) WAVELENGTH-CONVERTING DEVICE AND ILLUMINATION SYSTEM USING SAME

(71) Applicant: DELTA ELECTRONICS, INC., Taoyuan (TW)

(72) Inventors: Meng-Han Liu, Taoyuan (TW); Keh-Su Chang, Taoyuan (TW); Jau-Shiu Chen, Taoyuan (TW); Yen-I Chou, Taoyuan (TW); Chi Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 247 days.

(21) Appl. No.: 14/842,302

(22) Filed: Sep. 1, 2015

(65) Prior Publication Data

US 2016/0069535 A1    Mar. 10, 2016

Related U.S. Application Data

(60) Provisional application No. 62/046,529, filed on Sep. 5, 2014.

(30) Foreign Application Priority Data

Apr. 21, 2015 (TW) .............................. 104112773 A (51) Int. Cl.
*G02B 26/00* (2006.01)
*G03B 21/20* (2006.01)
(Continued)

(52) U.S. Cl.
CPC .......... *G02B 26/008* (2013.01); *G03B 21/204* (2013.01); *G03B 33/08* (2013.01); *G02B 27/141* (2013.01)

(58) Field of Classification Search
CPC .. G02B 26/008; G02B 21/204; G02B 27/141; G03B 33/08
See application file for complete search history.

(56) References Cited

U.S. PATENT DOCUMENTS

2007/0019408 A1 *    1/2007  McGuire, Jr. .........  F21S 10/007
                                                           362/231
2012/0201030 A1 *    8/2012  Yuan ....................  G02B 26/008
                                                           362/293
(Continued)

*Primary Examiner* — Mary Ellen Bowman
(74) *Attorney, Agent, or Firm* — Kirton McConkie; Evan R. Witt (57) ABSTRACT

A wavelength-converting device includes a first substrate, a second substrate and a first wavelength-converting material. The first substrate has a first region and a first engagement portion. The second substrate is disposed adjacent to the first substrate and having a second region and a second engagement portion. The second engagement portion and the first engagement portion have complementary shapes. The first wavelength-converting material is disposed on the second region for converting a light in a first waveband into a light in a second waveband. The light in the first waveband is transmitted through the first region, and the light in the second waveband is reflected by the second region. The first region and the second region are staggered, so that the first engagement portion and the second engagement portion are engaged and fixed with each other. As a result, the safety and stability are enhanced, and the noise is reduced.

20 Claims, 8 Drawing Sheets

(51) Int. Cl.
*G03B 33/08* (2006.01)
*G02B 27/14* (2006.01)

(56) References Cited

U.S. PATENT DOCUMENTS

| | | | | |
|---|---|---|---|---|
| 2012/0243205 A1* | 9/2012 | Lin | ................... | G03B 21/204 |
| | | | | 362/84 |
| 2013/0258639 A1* | 10/2013 | Hu | ........................ | F21V 9/08 |
| | | | | 362/84 |
| 2014/0204558 A1* | 7/2014 | Bartlett | ............... | G02B 26/008 |
| | | | | 362/84 |
| 2016/0004138 A1* | 1/2016 | Jao | ...................... | G02F 1/3532 |
| | | | | 353/31 |

* cited by examiner

WAVELENGTH-CONVERTING DEVICE AND ILLUMINATION SYSTEM USING SAME

CROSS-REFERENCE TO RELATED APPLICATION

This application claims the benefit of U.S. Provisional Application No. 62/046,529 filed on Sep. 5, 2014, and entitled "PUZZLE GLASS FOR HYBRID PW DESIGN", the entirety of which is hereby incorporated by reference.

FIELD OF THE INVENTION

The present invention relates to a wavelength-converting device, and more particularly to a stable and low noise wavelength-converting device and an illumination system using the same.

BACKGROUND OF THE INVENTION

A wavelength-converting device is an optical transducing device, which is mainly utilized for converting a wavelength of light into a wavelength of a visible light as a light source. Usually, it is applied to special lightings, such as spotlights, headlights, monitor lightings or projector lightings.

In general, most of conventional wavelength-converting devices are phosphor wheels. A phosphor wheel is used for transforming a light of a laser source into color lights with different wavelengths. Under the high-power operation, the optical converting efficiency of a phosphor wheel can significantly enhance the photoelectric conversion and the luminance output of a projector, such that the phosphor wheel becomes an important light source of new generation projection technology in recent years.

Figure 1:
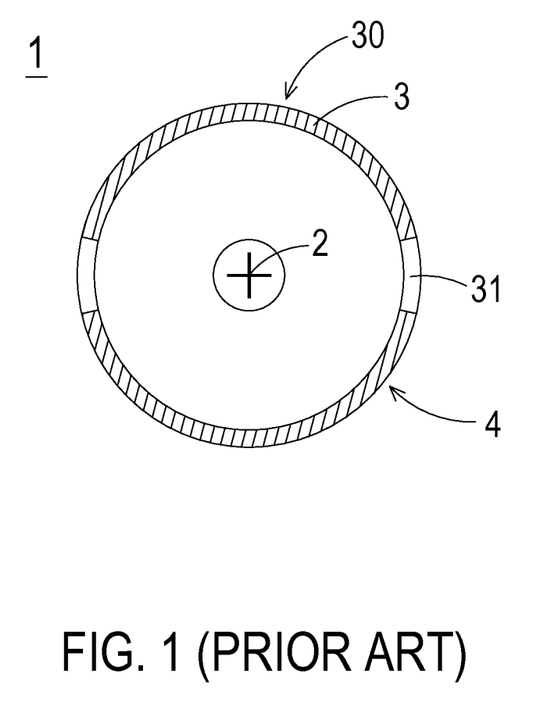
FIG. 1 schematically illustrates a conventional wavelength-converting device having a notch of prior art.

The common projector is provided with blue light laser and a conventional wavelength-converting device having a notch. Please refer to FIG. 1. FIG. 1 schematically illustrates a conventional wavelength-converting device having a notch of prior art. The conventional wavelength-converting device 1 is driven by a motor 2. Phosphor powder 4 is coated on the partial region 30 of a substrate 3. The substrate 3 of the conventional wavelength-converting device 1 is designed to have a notch 31 for controlling the blue light laser to transmit through the notch 31. By adjusting the size of the notch 31, the amount of the blue light laser that transmitting through the notch 31 can be adjusted. However, since the conventional wavelength-converting device 1 is a rotational member, the swing amount of the motor 2 is difficulty to be precisely controlled in high rotational speed. Meanwhile, the wind shear sound will be produced in high-speed rotation due to the shape of the notch 31, thereby becoming the source of noise. On the other hand, although a glass may be embedded in the notch 31 to reduce the noise, the glass may be separated from the substrate 3 in high-speed rotation due to the centrifugal force. Under this circumstance, the conventional wavelength-converting device 1 may be damaged, and even causing the dangers of users.

There is a need of providing a wavelength-converting device and an illumination system using the same to obviate the drawbacks encountered from the prior art.

SUMMARY OF THE INVENTION

It is an object of the present invention to provide a wavelength-converting device and an illumination system using the same in order to overcome the above-mentioned drawbacks encountered by the prior arts.

The present invention provides a wavelength-converting device and an illumination system using the same. By the complementary shapes of the first engagement portion of the first substrate and the second engagement of the second substrate, the first engagement portion and the second engagement portion are engaged and fixed with each other. Not only the wind shear sound caused by the rotation of the wavelength-converting device can be reduced, but also the separation of the first substrate and the second substrate during the high-speed rotation can be avoided. Therefore, the safety and stability are enhanced, and the noise is reduced.

The present invention also provides a wavelength-converting device and an illumination system using the same. Since the second substrate is tightly fixed by the fixing element in a one-piece fixing manner, no jig is needed for simultaneously fixing the first substrate and the second substrate. Furthermore, the rotational balance is simply implemented, and the advantages of convenient assembling and cost reducing are effectively achieved.

The present invention further provides a wavelength-converting device and an illumination system using the same. By selecting a transparent sheet, a diffuser sheet or a filter sheet as the first substrate, and further disposing a second wavelength-converting material, which is distinct from the first wavelength-converting material, the wavelength-converting device can be applied as different light sources for meeting the demands of various kinds of optical apparatuses. That is, the present invention is full of design diversity.

In accordance with an aspect of the present invention, there is provided a wavelength-converting device. The wavelength-converting device includes at least a first substrate, a second substrate and a first wavelength-converting material. Each of the first substrate has a first region and at least a first engagement portion. The second substrate is disposed adjacent to the first substrate. The second substrate has at least a second region and at least a second engagement portion. The second engagement portion and the first engagement portion have complementary shapes. The first wavelength-converting material is disposed on the second region for converting a light in a first waveband into a light in a second waveband. The light in the first waveband is transmitted through the first region, and the light in the second waveband is reflected by the second region. The first region and the second region are staggered, so that the first engagement portion and the second engagement portion are engaged and fixed with each other.

In accordance with another aspect of the present invention, there is provided an illumination system. The illumination system includes a solid-state light-emitting element and a wavelength-converting device. The solid-state light-emitting element is configured for emitting a light in a first waveband. The wavelength-converting device includes at least a first substrate, a second substrate and a first wavelength-converting material. Each of the first substrate has a first region and at least a first engagement portion. The second substrate is disposed adjacent to the first substrate. The second substrate has at least a second region and at least a second engagement portion. The second engagement portion and the first engagement portion have complementary shapes. The first wavelength-converting material is disposed on the second region for converting the light in the first waveband into a light in a second waveband. The light in the first waveband is transmitted through the first region, and the light in the second waveband is reflected by the second region. The first region and the second region are staggered, so that the first engagement portion and the second engagement portion are engaged and fixed with each other.

In accordance with another aspect of the present invention, there is provided a wavelength-converting device. The wavelength-converting device includes two first substrates and a second substrate. Each of the first substrate has two first engagement portions. A light in a first waveband is transmitted through the first substrates. The second substrate is disposed between the two first substrates. The second substrate has four second engagement portions. A light in a second waveband is reflected by the second substrate. Each of the first engagement portions is corresponding to one of the four second engagement portions, and each first engagement portion and each second engagement portion have complementary shapes, so that each first engagement portion and each second engagement portion are engaged and fixed with each other.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2A:
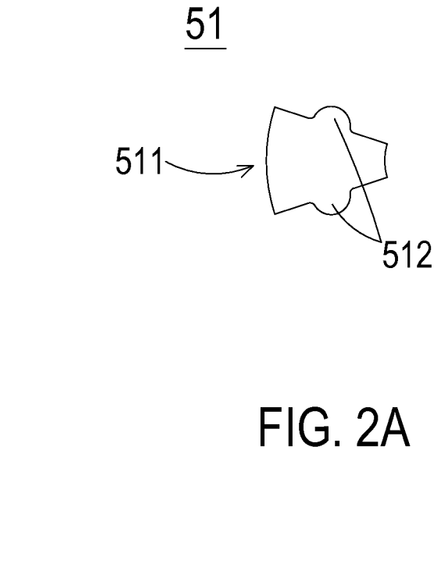
FIG. 2A schematically illustrates a first substrate according to an embodiment of the present invention.
Figure 2B:
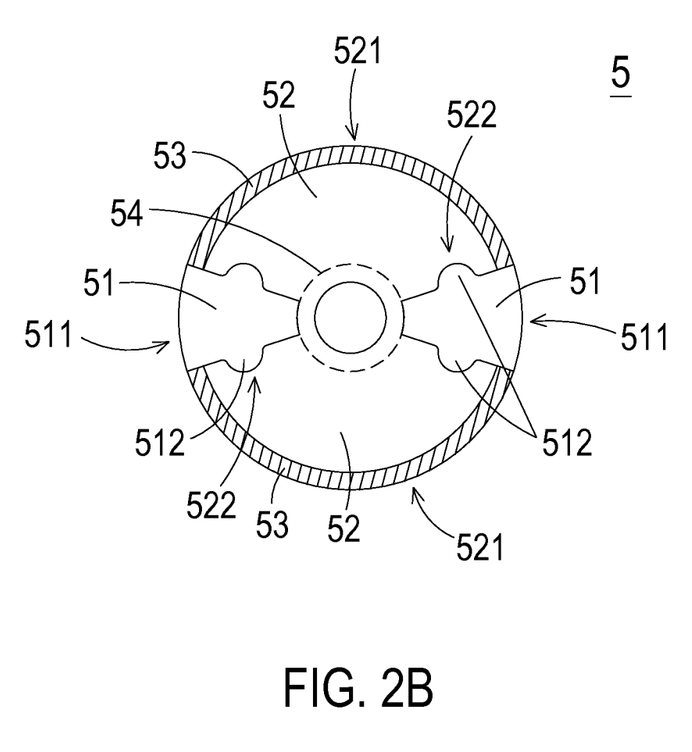
FIG. 2B schematically illustrates a wavelength-converting device utilizing the first substrate shown in FIG. 2A.

Please refer to FIG. 2A and FIG. 2B. FIG. 2A schematically illustrates a first substrate according to an embodiment of the present invention. FIG. 2B schematically illustrates a wavelength-converting device utilizing the first substrate shown in FIG. 2A. As shown in FIG. 2A and FIG. 2B, a wavelength-converting device 5 includes at least a first substrate 51, a second substrate 52 and a first wavelength-converting material 53. Each of the first substrate 51 has a first region 511 and at least a first engagement portion 512. The second substrate 52 is disposed adjacent to the first substrate 51. The second substrate 52 has at least a second region 521 and at least a second engagement portion 522. The second engagement portion 522 and the first engagement portion 512 have complementary shapes. In other words, when the first engagement portion 512 and the second engagement portion 522 are engaged with each other, the first engagement portion 512 and the second engagement portion 522 can be full-filled by each other. The first wavelength-converting material 53, which is not limited to phosphor powder, is disposed or coated on the second region 521. By the first wavelength-converting material 53, which is disposed or coated on the second region 521, the wavelength of a light, which is transmitted through the second region 521, can be converted. In this embodiment, when a light in a first waveband is transmitted through the first wavelength-converting material 53 disposed on the second region 521, the light in the first waveband is converted into a light in a second waveband. For example, a blue light can be converted into a visible light with wavelength greater than 460 nanometers. In addition, the light in the first waveband is transmitted through the first region 511, and the light in the second waveband is reflected by the second region 521.

The first region 511 and the second region 521 are staggered, so that the first engagement portion 512 and the second engagement portion 522 are engaged and fixed with each other. As a result, not only the wind shear sound caused by the rotation of the wavelength-converting device 5 can be reduced, but also the separation of the first substrate 51 and the second substrate 52 during the high-speed rotation can be avoided. Therefore, the safety and stability are enhanced, and the noise is reduced.

In some embodiments, the first substrate 51 and the second substrate 52 are made of different materials. For example, the first substrate 51 is made of glass or ceramic materials, and the second substrate is made of metal materials, but not limited thereto. The first substrate 51 and the second substrate 52 are engaged to form a wheel-shaped body, and the sum of the central angle corresponding to the first region 511 and the central angle corresponding to the second region 521 is 360 degrees (i.e. a complete circle).

Additionally, to meet different demands, the first substrate 51 is preferably a transparent sheet, a diffuser sheet or a filter sheet, but not limited herein. The first substrate 51 has an inner diameter and an outer diameter relative to the center of the wheel-shaped body, and the first engagement portion 512 is formed between the inner diameter and the outer diameter so as to be engaged with the second engagement portion 522, thereby resist the centrifugal force of rotations. Therefore, the first engagement portion 512 can be disposed at any position between the inner diameter and the outer diameter but not at a specific position.

In some embodiments, each of the first region 511 is disposed between the adjacent second regions 521, or each of the second region 521 is disposed between the adjacent first regions 511. The wavelength-converting device 5 of the present invention further includes a fixing element 54. The fixing element 54 is connected with the second substrate 52 for fixing the first substrate 51 and the second substrate 52, among which the fixing manner is not limited to a clamping manner or a adhering manner. In other words, the fixing element 54 is only connected with the second substrate 52 for fixing. Since the second substrate 52 is tightly fixed by the fixing element 54 in a one-piece fixing manner, no jig is needed for simultaneously fixing the first substrate 51 and the second substrate 52. Furthermore, the rotational balance is simply implemented, and the advantages of convenient assembling and cost reducing are effectively achieved.

Figure 3A:
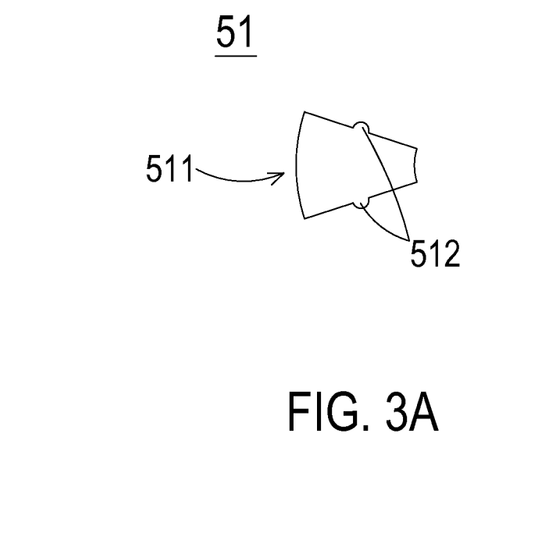
FIG. 3A schematically illustrates a first substrate according to an embodiment of the present invention.
Figure 3B:
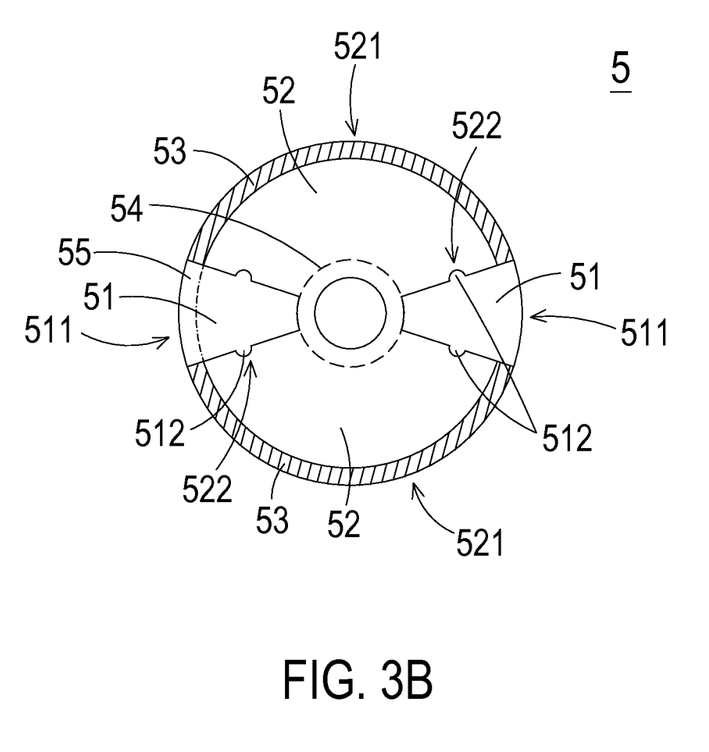
FIG. 3B schematically illustrates a wavelength-converting device utilizing the first substrate shown in FIG. 3A.

Please refer to FIG. 3A and FIG. 3B. FIG. 3A schematically illustrates a first substrate according to an embodiment of the present invention. FIG. 3B schematically illustrates a wavelength-converting device utilizing the first substrate shown in FIG. 3A. As shown in FIG. 3A and FIG. 3B, the first engagement portion 512 of the first substrate 51 of the wavelength-converting device 5 of the present invention is a circular protrusion, and the second engagement portion 522 of the second substrate 52 is a circular recess corresponding to the circular protrusion.

Figure 4A:
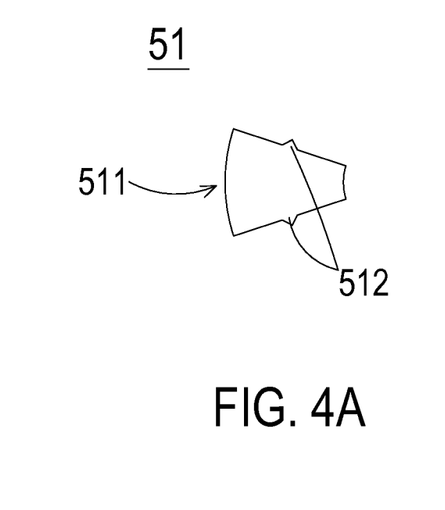
FIG. 4A schematically illustrates a first substrate according to an embodiment of the present invention.
Figure 4B:
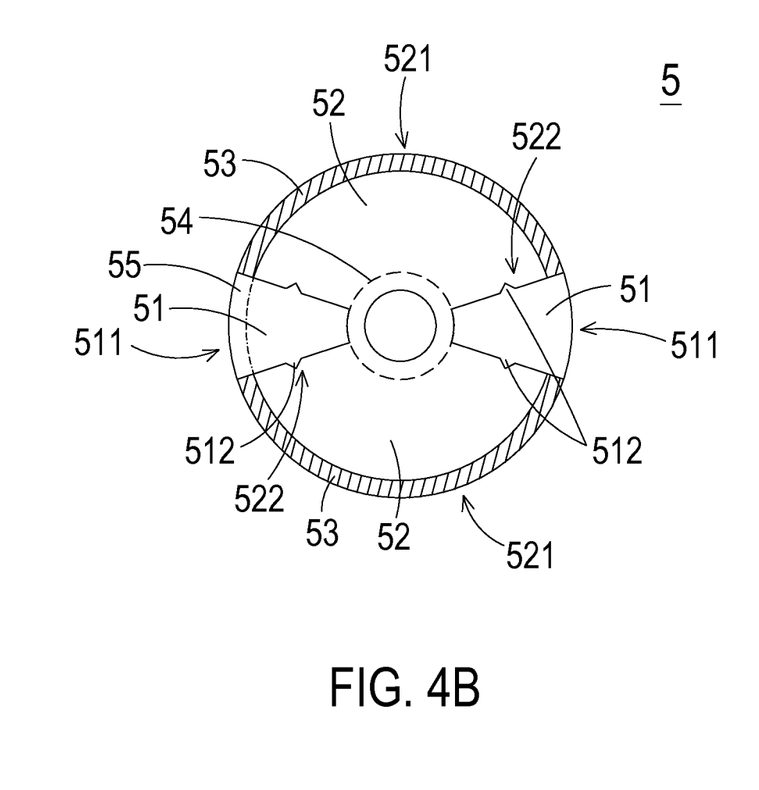
FIG. 4B schematically illustrates a wavelength-converting device utilizing the first substrate shown in FIG. 4A.

Please refer to FIG. 4A and FIG. 4B. FIG. 4A schematically illustrates a first substrate according to an embodiment of the present invention. FIG. 4B schematically illustrates a wavelength-converting device utilizing the first substrate shown in FIG. 4A. As shown in FIG. 4A and FIG. 4B, the first engagement portion 512 of the first substrate 51 of the wavelength-converting device 5 of the present invention is a polygonal protrusion, and the second engagement portion 522 of the second substrate 52 is a polygonal recess corresponding to the polygonal protrusion.

Figure 5A:
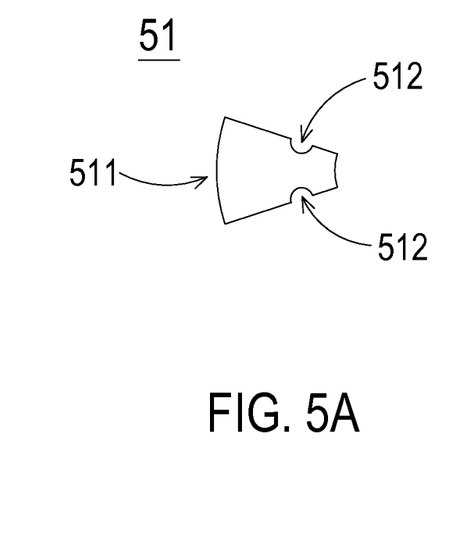
FIG. 5A schematically illustrates a first substrate according to an embodiment of the present invention.
Figure 5B:
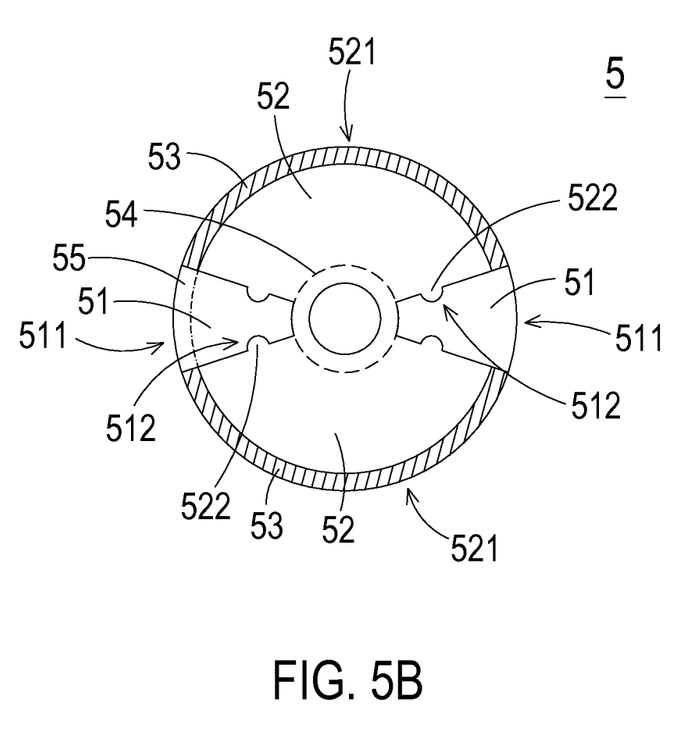
FIG. 5B schematically illustrates a wavelength-converting device utilizing the first substrate shown in FIG. 5A.

Please refer to FIG. 5A and FIG. 5B. FIG. 5A schematically illustrates a first substrate according to an embodiment of the present invention. FIG. 5B schematically illustrates a wavelength-converting device utilizing the first substrate shown in FIG. 5A. As shown in FIG. 5A and FIG. 5B, the first engagement portion 512 of the first substrate 51 of the wavelength-converting device 5 of the present invention is a circular recess, and the second engagement portion 522 of the second substrate 52 is a circular protrusion corresponding to the circular recess.

Figure 6A:
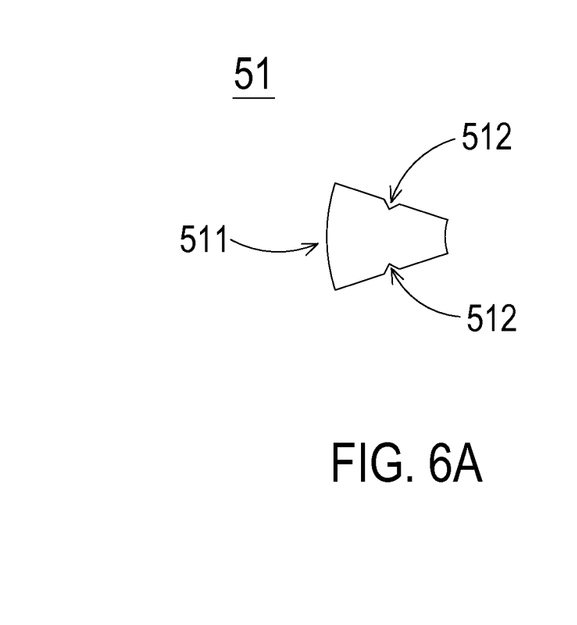
FIG. 6A schematically illustrates a first substrate according to an embodiment of the present invention.
Figure 6B:
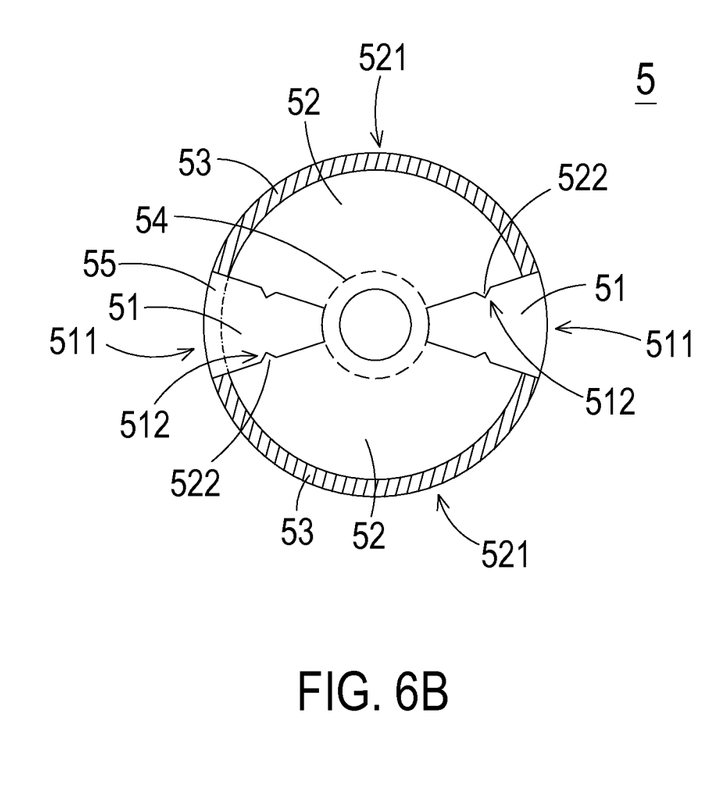
FIG. 6B schematically illustrates a wavelength-converting device utilizing the first substrate shown in FIG. 6A.

Please refer to FIG. 6A and FIG. 6B. FIG. 6A schematically illustrates a first substrate according to an embodiment of the present invention. FIG. 6B schematically illustrates a wavelength-converting device utilizing the first substrate shown in FIG. 6A. As shown in FIG. 6A and FIG. 6B, the first engagement portion 512 of the first substrate 51 of the wavelength-converting device 5 of the present invention is a polygonal recess, and the second engagement portion 522 of the second substrate 52 is a polygonal protrusion corresponding to the polygonal recess.

In brief, the first engagement portion 512 of the first substrate 51 and the second engagement portion 522 of the second substrate 52 can be circular or polygonal protrusion, or circular or polygonal recess. Although the polygonal protrusion and the polygonal recess are only represented by triangles in the drawings, the polygonal protrusion and the polygonal recess can certainly be a quadrilateral protrusion, a quadrilateral recess, a pentagonal protrusion, a pentagonal recess or the like, as which the present invention teaches.

In some embodiments, the wavelength-converting device 5 of the above-mentioned embodiments may further includes a second wavelength-converting material 55 disposed on the first region 511 of the first substrate 51 for converting the light in the first waveband into a light in a third waveband. In a preferred embodiment, the light in the third waveband is a cyan light with wavelength greater than or equal to 460 nanometers and less than or equal to 520 nanometers, and the peak value of the cyan light is 490 nanometers, but not limited thereto. In another embodiments, the light in the third waveband is a green light with wavelength greater than or equal to 470 nanometers and less than or equal to 530 nanometers, but not limited herein. That is, by selecting a transparent sheet, a diffuser sheet or a filter sheet as the first substrate 51, and further disposing a second wavelength-converting material 55, which is distinct from the first wavelength-converting material 53, the wavelength-converting device 5 can be applied as different light sources for meeting the demands of various kinds of optical apparatuses. The present invention is full of design diversity.

Figure 7A:
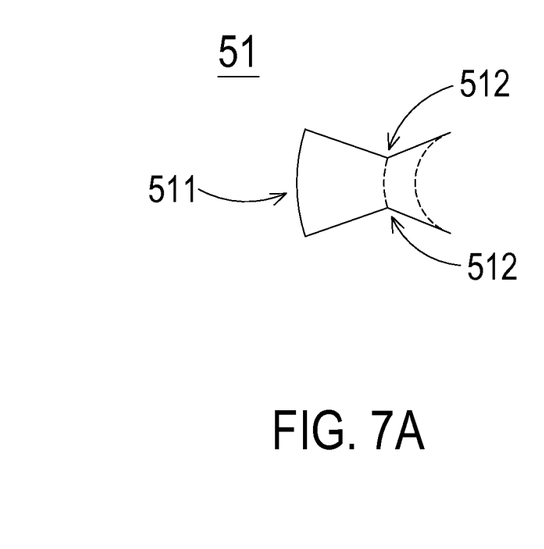
FIG. 7A schematically illustrates a first substrate according to an embodiment of the present invention.
Figure 7B:
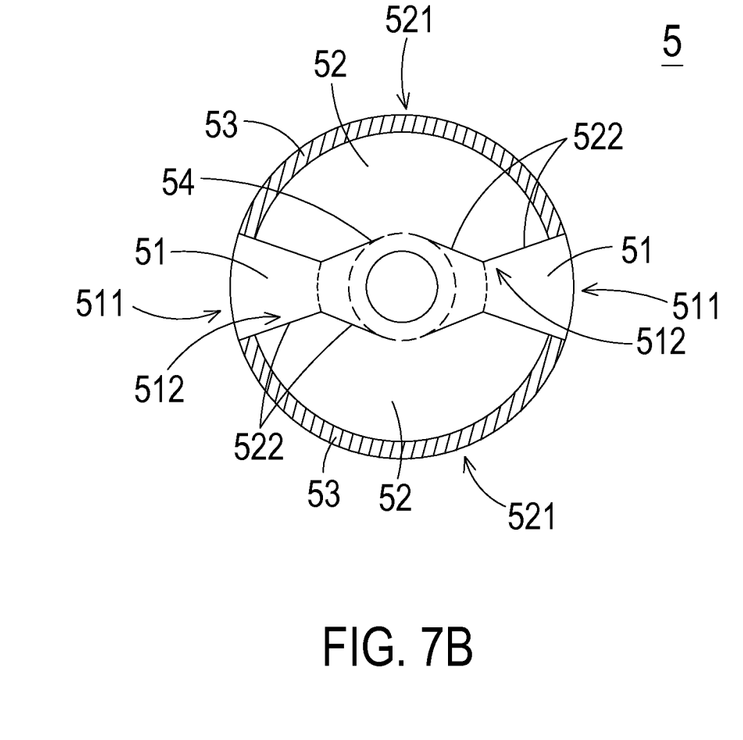
FIG. 7B schematically illustrates a wavelength-converting device utilizing the first substrate shown in FIG. 7A.

Please refer to FIG. 7A and FIG. 7B. FIG. 7A schematically illustrates a first substrate according to an embodiment of the present invention. FIG. 7B schematically illustrates a wavelength-converting device utilizing the first substrate shown in FIG. 7A. As shown in FIG. 7A and FIG. 7B, the first engagement portion 512 of the first substrate 51 of the wavelength-converting device 5 of the present invention can be not only formed in the manners of the embodiments mentioned above, but also formed from the inner diameter to the outer diameter. In other words, the first substrate 51 is substantially formed with a cutting design of wide inside and narrow outside. The inner diameter is designed as a wide caliber, and the position corresponding to the peak value of the recessing of the first engagement portion 512 is designed as a narrow caliber.

Figure 8:
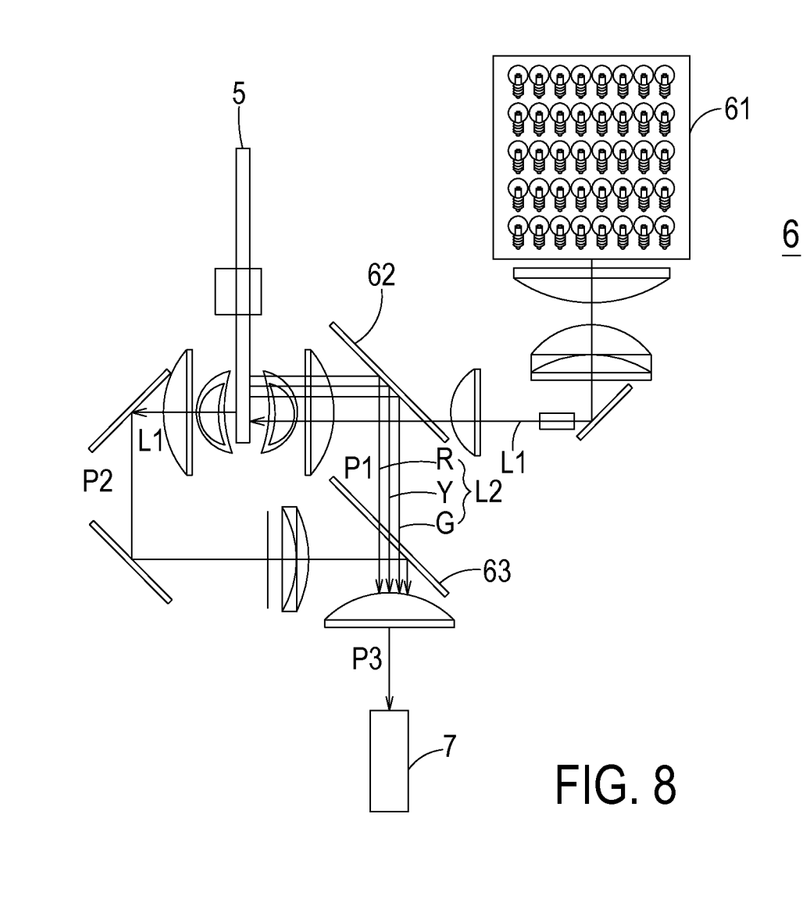
FIG. 8 schematically illustrates the configuration of an illumination system according to an embodiment of the present invention.

Please refer to FIG. 2A, FIG. 2B and FIG. 8. FIG. 8 schematically illustrates the configuration of an illumination system according to an embodiment of the present invention. As shown in FIG. 2A, FIG. 2B and FIG. 8, the wavelength-converting device 5 of the present invention is applied to an illumination system 6. The illumination system 6 includes a solid-state light-emitting element 61 and the above-mentioned wavelength-converting device 5. The solid-state light-emitting element 61 is configured for emitting a light L1 in a first waveband. The wavelength-converting device 5 is configured for converting the light L1 in the first waveband into a light L2 in a second waveband through the first wavelength-converting material 53 disposed on the second region 521 of the second substrate 52, reflecting the light L2 in the second waveband to a first optical path P1 through the second region 521, and allowing the light L1 in the first waveband to transmit through the first region 511 of the first substrate 51 so as to be outputted to a second optical path P2 through the first substrate 51 (e.g. a glass substrate).

In this embodiment, the light L1 in the first waveband is a blue light, and the first wavelength-converting material 53 includes at least one kind of phosphor powder. In other words, the first wavelength-converting material 53 can be composed of one or more kind of phosphor powder to have different wavebands for converting the light L1 in the first waveband into a red light R and a green light G. The first wavelength-converting material 53 can also be a single kind of phosphor agent for converting the light L1 in the first waveband into a yellow light Y containing the wavebands of a red light R and a green light G. In sum, in the preferred embodiments, the light L1 in the first waveband is preferably a blue light, and the light L2 in the second waveband is preferably a red light R, a green light G or a yellow light Y. Moreover, a third optical path P3 is disposed between the first optical path P1 and the second optical path P2, and the first optical path P1 and the second optical path P2 are converged at the third optical path P3, so that the light L1 in the first waveband and the light L2 in the second waveband are integrated so as to be outputted to a optical apparatus 7 through the third optical path P3. Therefore, the three primary color lights (i.e. blue light, red light and green light) can be utilized for projection. Certainly, the three primary color lights can also be utilized with yellow light for projection, which is preferably a sequential projection.

In addition, the illumination system 6 of the present invention further includes a first dichroic mirror 62 and a second dichroic mirror 63 disposed on the first optical path P1. The first dichroic mirror 62 is disposed between the solid-state light-emitting element 61 and the wavelength-converting device 5, and the second dichroic mirror 63 is disposed between the first dichroic mirror 62 and the optical apparatus 7. It should be noted that the second dichroic mirror 63 is disposed between the first optical path P1 and the third optical path P3, and between the second optical path P2 and the third optical path P3, so that the first optical path P1 and the second optical path P2 are integrated by the second dichroic mirror 63 so as to be outputted to the third optical path P3.

Furthermore, the illumination system 6 further includes a first reflector 64 and a second reflector 65. The first reflector 64 and the second reflector 65 are sequentially disposed between the wavelength-converting device 5 and the second dichroic mirror 63 on the second optical path P2 for reflecting the light L1 (e.g. a blue light) in the first waveband and allowing other color lights to transmit through.

Please refer to FIG. 2A and FIG. 2B again. In an preferred embodiment, the wavelength-converting device 5 used for converting a light in a first waveband includes two first substrates 51 and a second substrate 52. Each of the first substrate 51 has two first engagement portions 512. The light in the first waveband is transmitted through the first substrates 51. The second substrate 52 is disposed between the two first substrates 51. The second substrate 52 has four second engagement portions 522. The light in the first waveband is converted into a light in a second waveband by the second substrate 52, and then the light in the second waveband is reflected by the second substrate 52. Each of the first engagement portions 512 is corresponding to one of the four second engagement portions 522, and each first engagement portion 512 and each second engagement portion 522 have complementary shapes, so that each first engagement portion 512 and each second engagement portion 522 are engaged and fixed with each other From the above description, the present invention provides a wavelength-converting device and an illumination system using the same. By the complementary shapes of the first engagement portion of the first substrate and the second engagement of the second substrate, the first engagement portion and the second engagement portion are engaged and fixed with each other. Not only the wind shear sound caused by the rotation of the wavelength-converting device can be reduced, but also the separation of the first substrate and the second substrate during the high-speed rotation can be avoided. Therefore, the safety and stability are enhanced, and the noise is reduced.

The present invention also provides a wavelength-converting device and an illumination system using the same. Since the second substrate is tightly fixed by the fixing element in a one-piece fixing manner, no jig is needed for simultaneously fixing the first substrate and the second substrate. Furthermore, the rotational balance is simply implemented, and the advantages of convenient assembling and cost reducing are effectively achieved.

The present invention further provides a wavelength-converting device and an illumination system using the same. By selecting a transparent sheet, a diffuser sheet or a filter sheet as the first substrate, and further disposing a second wavelength-converting material, which is distinct from the first wavelength-converting material, the wavelength-converting device can be applied as different light sources for meeting the demands of various kinds of optical apparatuses. That is, the present invention is full of design diversity.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wavelength-converting device, comprising:
   at least a first substrate, wherein each of the first substrate has a first region and at least a first engagement portion;
   a second substrate disposed adjacent to the first substrate, wherein the second substrate has at least a second region and at least a second engagement portion, and the second engagement and the first engagement portion have complementary shapes; and
   a first wavelength-converting material disposed on the second region for converting a light in a first waveband into a light in a second waveband,
   wherein the light in the first waveband is transmitted through the first region, the light in the second waveband is reflected by the second region, and the first region and the second region are staggered, so that the first engagement portion and the second engagement portion are engaged and fixed with each other.

2. The wavelength-converting device according to claim 1, wherein the first substrate and the second substrate are made of different materials and engaged to form a wheel-shaped body, and the sum of the central angle corresponding to the first region and the central angle corresponding to the second region is 360 degrees.

3. The wavelength-converting device according to claim 2, wherein the first substrate has an inner diameter and an outer diameter relative to the center of the wheel-shaped body, and the first engagement portion is formed between the inner diameter and the outer diameter.

4. The wavelength-converting device according to claim 1, wherein the first engagement portion is a circular protrusion, and the second engagement portion is a circular recess corresponding to the circular protrusion.

5. The wavelength-converting device according to claim 1, wherein the first engagement portion is a polygonal protrusion, and the second engagement portion is a polygonal recess corresponding to the polygonal protrusion.

6. The wavelength-converting device according to claim 1, wherein the first engagement portion is a circular recess, and the second engagement portion is a circular protrusion corresponding to the circular recess.

7. The wavelength-converting device according to claim 1, wherein the first engagement portion is a polygonal recess, and the second engagement portion is a polygonal protrusion corresponding to the polygonal recess.

8. The wavelength-converting device according to claim 1 further comprising a fixing element, wherein the fixing element is connected with the second substrate for fixing the first substrate and the second substrate.

9. The wavelength-converting device according to claim 1, wherein each of the first region is disposed between the adjacent second regions, or each of the second region is disposed between the adjacent first regions.

10. The wavelength-converting device according to claim 1, wherein the first substrate is a transparent sheet, a diffuser sheet or a filter sheet.

11. The wavelength-converting device according to claim 1, wherein the light in the first waveband is a blue light, and the light in the second waveband is a visible light with wavelength greater than 460 nanometers.

12. The wavelength-converting device according to claim 1 further comprising a second wavelength-converting material disposed on the first region for converting the light in the first waveband into a light in a third waveband.

13. The wavelength-converting device according to claim 12, wherein the light in the third waveband is a cyan light with wavelength greater than or equal to 460 nanometers and less than or equal to 520 nanometers, and the peak value of the cyan light is 490 nanometers.

14. The wavelength-converting device according to claim 12, wherein the light in the third waveband is a green light with wavelength greater than or equal to 470 nanometers and less than or equal to 530 nanometers.

15. An illumination system, comprising:
a solid-state light-emitting element configured for emitting a light in a first waveband; and
a wavelength-converting device comprising:
at least a first substrate, wherein each of the first substrate has a first region and at least a first engagement portion;
a second substrate disposed adjacent to the first substrate, wherein the second substrate has at least a second region and at least a second engagement portion, and the second engagement and the first engagement portion have complementary shapes; and
a first wavelength-converting material disposed on the second region for converting the light in the first waveband into a light in a second waveband,
wherein the light in the first waveband is transmitted through the first region, the light in the second waveband is reflected by the second region, and the first region and the second region are staggered, so that the first engagement portion and the second engagement portion are engaged and fixed with each other.

16. The illumination system according to claim 15, wherein the light in the second waveband is reflected to a first optical path by the second region, and the light in the first waveband is transmitted through the first region and outputted to a second optical path.

17. The illumination system according to claim 16, wherein a third optical path is disposed between the first optical path and the second optical path, and the first optical path and the second optical path are converged at the third optical path, so that the light in the first waveband and the light in the second waveband are integrated so as to be outputted to a optical apparatus through the third optical path.

18. The illumination system according to claim 17 further comprising:
a first dichroic mirror disposed between the solid-state light-emitting element and the wavelength-converting device for allowing the light in the first waveband to transmit through and reflecting the light in the second waveband; and
a second dichroic mirror disposed between the first dichroic mirror and the optical apparatus for reflecting the light in the first waveband and allowing the light in the second waveband to transmit through, so that the first optical path and the second optical path are integrated so as to be outputted to the third optical path.

19. The illumination system according to claim 18 further comprising a first reflector and a second reflector, wherein the first reflector and the second reflector are sequentially disposed between the wavelength-converting device and the second dichroic mirror on the second optical path for reflecting the light in the first waveband and allowing other color lights to transmit through.

20. A wavelength-converting device, comprising:
two first substrates, wherein each of the first substrate has two first engagement portions, and a light in a first waveband is transmitted through the first substrates; and
a second substrate disposed between the two first substrates, wherein the second substrate has four second engagement portions, and a light in a second waveband is reflected by the second substrate,
wherein each of the first engagement portions is corresponding to one of the four second engagement portions, and each first engagement portion and each second engagement portion have complementary shapes, so that each first engagement portion and each second engagement portion are engaged and fixed with each other.

* * * * *